United States Patent [19]

Kazumi

[11] Patent Number: 4,678,304

[45] Date of Patent: Jul. 7, 1987

[54] INTERVAL SHOOTING DEVICE

[75] Inventor: Jiro Kazumi, Kanagawa, Japan

[73] Assignee: Canon Kabushiki Kaisha, Tokyo, Japan

[21] Appl. No.: 844,823

[22] Filed: Mar. 27, 1986

[30] Foreign Application Priority Data

Apr. 2, 1985 [JP] Japan .................................. 60-069472

[51] Int. Cl.$^4$ .......................... G03B 1/12; G03B 17/40
[52] U.S. Cl. .............................. 354/173.11; 354/267.1
[58] Field of Search ............ 354/173.11, 267.1, 289.12

[56] References Cited

U.S. PATENT DOCUMENTS 4,400,074  8/1983  Alsiyama et al. ............... 354/173.11
4,466,721  8/1984  Detuzzi ............................ 354/267.1

Primary Examiner—Michael L. Gellner
Attorney, Agent, or Firm—Toren, McGeady & Associates

[57] ABSTRACT

This invention relates to an interval shooting device for producing release signals in a constant period to recycle the release operation with the constant period. When the winding of film does not really complete within a prescribed time required from the termination of the exposure to the completion of film winding, the subsequent shooting control by the interval shooting device is prohibited.

10 Claims, 3 Drawing Figures

INTERVAL SHOOTING DEVICE

BACKGROUND OF THE INVENTION

1. Field of the Invention

This invention relates to an interval shooting device for actuating a release operation repeatedly in a preset time interval.

2. Description of the Prior Art

The conventional device of this kind has been comprised only of a timer for producing a train of release signals with a preset period. When a camera is set up with this device, interval shots become possible to take. Because this device operates independently of the film feeding condition of the camera, there is a drawback that even after the film is tensioned, as, for example, it has been used up to the last frame, the camera continues being actuated for release endlessly. To avoid this, it may be considered that when the camera release does not take place within a prescribed time measured from the production of the release signal from the timer, the device is forcibly rendered inoperative. Thus, the above-described problem is eliminated. However, for example, when it happens that the exposure time becomes longer than the preset interval in the device, as the next release signal will occur at a time during the exposure, the releasing of the camera is deferred until that exposure terminates and the film is wound up one frame. In this case, too, there will be an alternative drawback that the interval shooting is interrupted since the timer is rendered inoperative similarly to the case of encountering the filming end.

SUMMARY OF THE INVENTION

With the foregoing in mind, it is an object of the present invention to provide an interval shooting device for a camera in which when the exposure time becomes longer than the preset interval, the next camera release is actuated at the termination of the shooting cycle, and when the film has all been used up to the last frame, no more actuating signals for interval shooting are produced.

This and other objects will become apparent from the following description of an embodiment thereof by reference to the drawings.

DETAILED DESCRIPTION OF THE PREFERRED EMBODIMENT

Figure 1:
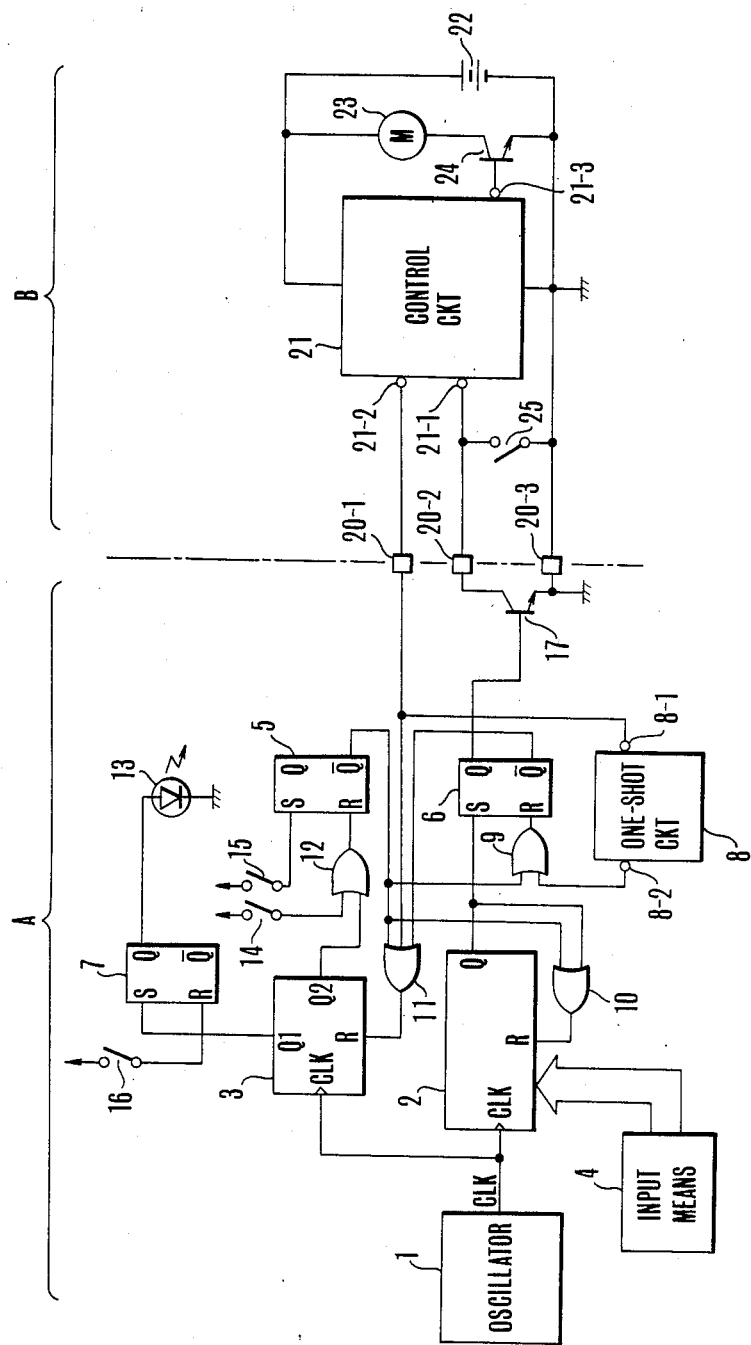
FIG. 1 is an electrical circuit diagram of an embodiment of an interval shooting device according to the present invention.

In FIG. 1 there is shown one embodiment of the invention where the left hand half A of the circuit represents the interval shooting device including an oscillator circuit 1 for producing a train of standard clock pulses, and a presettable up-counter 2 whose output terminal Q changes to "H" level when a corresponding numer of clock pulses to a desired time interval preset in input means 4 have entered a CLK terminal thereof. When its R terminal changes to "H" level, the counter 2 is reset to zero in the counted value. Another up-counter 3 changes its output Q1 to "H" when the counted number of pulses CLK reaches a value N1, and its another output Q2 to "H" when it reaches a larger value N2 than N1. This counter 3 is also reset to zero in the counted value when "H" enters its R terminal. Three resettable latch circuits 5, 6 and 7 each responsive to "H" input at its S terminal produce "H" and "L" levels at the outputs Q and $\bar{Q}$ respectively and responsive to "H" input at its R terminal produce "L" and "H" levels at the outputs Q and $\bar{Q}$ respectively. When no "H" inputs are present at both terminals, the preceding state continues being latched without further alternation. A one-shot circuit 8 responsive to change of a signal from "L" to "H" at its input 8-1 changes its output 8-2 to "H" level and maintains it for a prescribed time. Four OR gates 9, 10, 11 and 12 each produce an output of "H" level when at least one of its inputs has "H" level. An LED 13 gives off light when the output Q of the latch circuit 7 is "H" level. Three switches 14, 15 and 16 when ON produces outputs of "H" level which are applied to the OR gate 12, the S terminal of the latch circuit 7 and the R terminal of the latch circuit 7 respectively. The switches 15 and 14 function respectively to initiate and terminate an operation of the interval shooting device. The switch 16 is a manual switch for lighting off the LED. A transistor 17 is in conducting state when the output Q of the latch circuit 6 is "H" level.

The right hand half B of the circuit of FIG. 1 represents a camera releasably connected to the device A. The camera B includes a control circuit 21. After the film has been wound up and the shutter has been charged, when its input 21-1 is given "L", the control circuit 21 releases the shutter. During the exposure, it produces "H" at the output 21-2. At the termination of the exposure, its output 21-3 is changed to "H" and maintained at "H" for a prescribed time, thereby a transistor 24 is rendered conducting. An electric motor 23 drives shutter charging and film winding mechanisms. A release switch 25 is operated by a shutter button. Interconnectors 20-1 to 20-3 are between the device A and the camera B. 22 is an electrical power source or battery.

Figure 2:
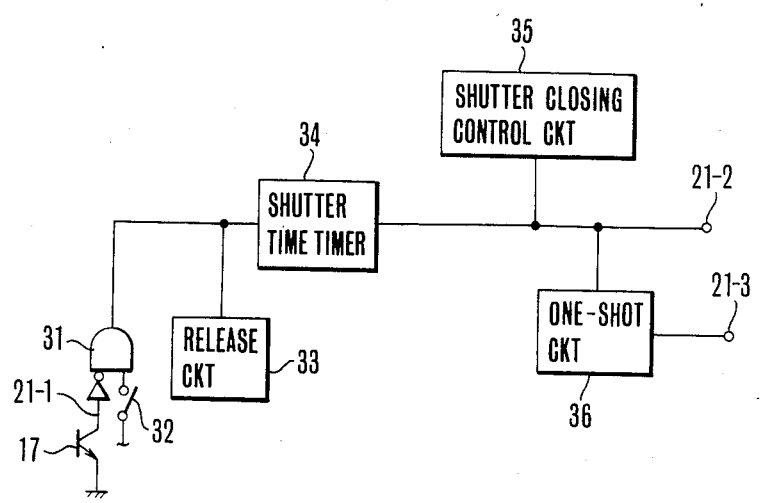
FIG. 2 illustrates the details of the control circuit 21 of FIG. 1.

Referring to FIG. 2, the control circuit 21 comprises an AND gate 31 having two inputs, one of which is connected through an inverter to the interconnector 20-1 and the other of which is connected to the output of a switch 32, the switch 32 being arranged upon completion of shutter charging to turn on in cooperation with a shutter charging mechanism, a release circuit 33 of known construction having an input connected to the output of the AND gate 31, so that a release operation is initiated by the circuit 33 in response to change of the output of the gate 31 to "H" level, a shutter time forming circuit or timer 34 whose operation is initiated in synchronism with the start of releasing of the shutter, the output of the timer 34 taking H level during the exposure and changing to L level at the termination of duration of the shutter time, a shutter closing control circuit 35 of known construction responsive to change of the output of the timer 34 from H to L for causing the trailing curtain of the shutter to run down, and a oneshot circuit 36 responsive to change of the output of the timer 34 from H to L for producing a pulse of prescribed duration.

The operation of the circuit of FIGS. 1 and 2 is as follows: Now, the latch circuit 5 is assumed to be in the resetting state. Since, in this state, the output $\bar{Q}$ of the latch circuit 5 is "H", the counters 2 and 3 and the latch circuit 6 are in the resetting state.

Then, when the operator pushes a start button (not shown), the switch 15 is instantaneously turned on, thereby the latch circuit 5 is set and its output $\overline{Q}$ is changed to "L". Therefore, the counter 2 is released from the resetting and starts to count clock pulses from the oscillation circuit 1. As the counting goes on, when the counted number of pulses reaches the preset value of interval time by the input means 4, the counter 2 changes its output Q to "H" which is applied to set the latch circuit 6. Thereupon, the transistor 17 turns on. Responsive to this, or change of the input 21-1 of the control circuit 21 to "L", the control circuit 21 releases the shutter, while simultaneously changing its output 21-2 to "H". This output is maintained at "H" during the time when the shutter is being released (during the exposure). Such setting of the latch circuit 6 also results in that all the three inputs of the OR gate 11 coincide in "L". It is, therefore, at this point in time that the counter 3 is released from the resetting. But, as the shutter has been released, the output 21-2 of the control circuit 21 changes to "H", thereupon the counter 3 is reset again. In this connection it should be pointed out that the above-stated value N1 is previously so determined that the time from the start of counting of the counter 3 till its counted number reaches N1 is longer than the time from the change of the input 21-1 of the control circuit 21 to "L" till the change of the output 21-2 to "H". So long as the operation is normal, therefore, the counter 3 is reset again before its outputs Q1 and Q2 change to "H", and it does not occur that the latch circuit 7 is set, or the latch circuit 5 is reset.

It is also to be noted that such change of the output 21-2 of the control circuit 21 to "H" also causes the one-shot circuit 8 to produce a pulse, which is then applied to reset the latch circuit 6. Therefore, as soon as the shutter is released, the transistor 17 turns off.

After the control circuit 21 has released the shutter, when the exposure time that was automatically computed based on the output of a light meter or determined in correspondence to the manually preset value of shutter speed, elapses, the shutter is then closed. Responsive to this, the control circuit 21 changes its output 21-2 to "L" again and produces a pulse of prescribed duration at the output 21-3 thereof. This pulses then turns on the transistor 24. By the energized motor 23, the film is advanced one frame, and the shuter is charged. Thus, one cycle of shooting operation terminates.

Meanwhile, after the first release of the shutter was actuated by setting the latch circuit 6 at the termination of the first cycle of counting operation of the counter 2, it has been reset again, starting a second cycle of counting operation from zero. When the counted number reaches the value preset in the input means 4, the control circuit 21 produces "H" at the output Q thereof. Thus, the second release of the shutter is actuated. In such a way, the timer device A operates the camera so that a series of shots are taken with the prescribed time interval preset in the input means 4.

The foregoing mode of operation is valid when the time necessary to complete one cycle of operation of the control circuit 21 is shorter than the preset value of the intervening time in the input means 4. If it happens that the exposure time becomes longer than the intervening time, the device A operates in the following manner.

Since, in this case, the change of the output Q of the counter 2 to "H" occurs at a time during the exposure, it will result that the output 21-2 of the control circuit 21 continues taking "H" even at a time when the output Q of the counter 2 changes to "H". Therefore, even after the latch circuit 6 has been set by the output Q, the one-shot circuit 8 is continuously supplied with "H". So, the one-shot circuit 8 is not activated, leaving the latch circuit 6 in the setting state.

When the control circuit 21 changes its output 21-2 to "L" in response to termination of the exposure, the counter 3 then starts to count, because all the inputs of the OR gate 11 are "L".

Meanwhile, as has been described above, the latch circuit 6 is being held in the setting state, causing the transistor 17 to be conducting, and therefore causing the input 21-1 of the control circuit 21 to retain "L". Therefore, as has been described above, after the exposure was terminated, when the film winding operation has been completed by the motor 23, the control circuit 21 becomes responsive to "L" of the input 21-1. Again, the control circuit 21 operates, releasing the shutter again. Because the output 21-2 changes to "H" again, the one-shot circuit 8 operates, releasing the latch circuit 6 from the setting. At this point in time, the counter 3 is prohibited from counting. Also, as has been described above, the counter 3 has started to count after the termination of the exposure, and performs this counting operation until the release operation is initiated again after the film has been wound up, or until the output 21-2 of the control circuit 21 changes to "H" as has been described above. This counting time is defined as a constant time T1 from the termination of the exposure through the film winding operation to the initiation of the next shutter release. On the other hand, the time necessary for the counter 3 to count the prescrived value N2 of the number of pulses or to produce "H" at the output Q2 thereof is defined as a longer constant time T2 than T1. In this case, therefore, the latch circuit 7 is set, causing the LED 13 to give off light as a warning signal representing that the exposure is longer than the preset value of the interval. Even in this case, however, the latch circuit 5 is never reset.

In a photographic situation where a longer exposure time than the desired value of interval, therefore, the operator is warned by the LED 13, that the releasing of the shutter is recycled each time the film has been advanced one frame, that is, at the termination of each cycle of shooting operation.

Now assuming that the film is tensioned at a time during the film winding operation as the film has been exposed to the last frame, then the control circuit 21 continues being prohibited from being responsive to change of the input 21-1 to "L". In this case, therefore, the output 21-2 of the control circuit 21 is caused to remain at "L". Therefore, the one-shot circuit 8 no longer does operate. So the latch circuit 6 is never reset after it has been set by the output of the counter 2, and, as has been described above, the output 21-2 of the control circuit 21 is being left unchanged from "L". In this state, therefore, the counter 3 continues counting. When its output Q2 then changes to "H", the latch circuit 5 is reset, causing the counters 2 and 3 and the latch circuit 6 to be reset. Thus, the series of shots with the interval timer stops.

To manually interrupt the series of interval shots, the operator needs only to turn on the switch 14. If so, the latch circuit 5 is reset. The subsequent procedure goes on in a similar manner to that described above.

A data imprinting device may be connected to the terminal 20-1 in the above-described embodiment. Since the signal appearing at the terminal 20-1 changes from "L" to "H" at the start of the exposure, the desired data can be imprinted on the film in good timing.

The output Q of the latch circuit 7 may be used for turning on an electrical power source of a strobe. If so, a flash exposure mode is selected in automatic response to increase of the exposure above a preset value. With the camera of the so-called aperture priority type, as the object brightness decreases, the exposure time increases. In this case, therefore, flash photography automatically takes place, as has been described above.

As has been described above, the present invention is to provide an interval timer device for a camera in which when it happens that the exposure time becomes longer than the preset intervening time, actuation of the next camera release is deferred pending the termination of that shooting cycle. Also when the last film frame has been exposed, the operation of the interval timer device is automatically stopped. Thus, it is made possible to eliminate the drawbacks of the conventional device.

Figure 3:
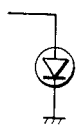
FIG. 3 illustrates an example of informing means usable in the circuit of FIG. 1.

To inform the operator of when the film has been used up to the last frame, an additional LED shown in FIG. 3 may be connected to the output A2 of the counter 3 of the FIG. 1 embodiment.

What is claimed is:

1. An interval timer device for a camera in which a train of actuating signals for releasing the camera are produced with a prescribed period, comprising:
    (a) a timer circuit responsive to termination of an exposure of the camera for counting time;
    (b) a circuit for stopping said timer circuit from further counting time when a shutter charging operation or a film winding operation that follows the termination of the exposure by a motor circuit completes; and
    (c) a prohibiting circuit for stopping said control operation of said interval timer device when the time counting of said timer circuit has been performed for a prescribed time.

2. A device according to claim 1, wherein said prescribed time is taken at a longer value than the time necessary to complete a charging or transporting from the exposure termination.

3. An interval timer device for a camera in which a train of actuating signals for releasing the camera are produced with a prescribed period, comprising:
    (a) a discriminating circuit for detecting the termination of an exposure of said camera and discriminating whether or not the shutter charging or the film winding by a motor circuit has completed within a prescribed time from the termination of the exposure; and
    (b) a circuit for prohibiting said interval timer device from controlling the operation when the fact that the shutter charging or the film winding does not complete within said prescribed time is detected by said discriminating circuit.

4. A device according to claim 3, wherein said prescribed time is taken at a longer value than the time necessary to complete a charging or transporting from the exposure termination.

5. A camera system comprising:
    (a) an interval timer for producing a train of release signals with a prescribed period;
    (b) an exposure circuit responsive to the release signal from said timer for performing an exposure operation;
    (c) a motor circuit arranged to operate after the termination of the exposure by said exposure circuit and to perform either a shutter charging or a film transporting operation; and
    (d) a prohibiting circuit for prohibiting said timer from operating when said shutter charging or film transporting does not complete within a prescribed time from the termination of the exposure.

6. A camera system according to claim 5, wherein said prescribed time is taken at a longer value than the time necessary to complete a charging or transporting from the exposure termination.

7. An interval timer device for a camera in which a train of actuating signals for releasing the camera are produced with a prescribed period, comprising:
    (a) a discriminating circuit for detecting the termination of an exposure of said camera and discriminating whether or not the shutter charging or the film winding by a motor circuit has completed within a prescribed time from the termination of the exposure; and
    (b) warning means responsive to detection of the fact that the shutter charging or the film transporting does not complete within said prescribed time by said discriminating circuit for informing this.

8. A device according to claim 7, wherein said prescribed time is taken at a longer value than the time necessary to complete a charging or transporting from the exposure termination.

9. A camera system comprising:
    (a) an interval timer for producing a train of release signals with a prescribed period;
    (b) an exposure circuit responsive to the release signal from said timer for performing an exposure operation;
    (c) a motor circuit arranged to operate after the termination of the exposure by said exposure circuit and to perform either a shutter charging or a film transporting operation; and
    (d) warning means responsive to detection of the fact that said shutter charging or film transporting does not complete within a prescribed time from the termination of the exposure for informing this.

10. A camera system according to claim 9 wherein said prescribed time is taken at a longer value than the time necessary to complete a charging or transporting from the exposure termination.

* * * * *